United States Patent
Bigot et al.

(10) Patent No.: US 7,845,156 B2
(45) Date of Patent: Dec. 7, 2010

(54) TURBOFAN EXHAUST SYSTEM

(75) Inventors: Pascal Moise Michel Bigot, Moisenay (FR); Philippe Gerard Chanez, Paris (FR)

(73) Assignee: SNECMA, Paris (FR)

( * ) Notice: Subject to any disclaimer, the term of this patent is extended or adjusted under 35 U.S.C. 154(b) by 986 days.

(21) Appl. No.: 11/627,643

(22) Filed: Jan. 26, 2007

(65) Prior Publication Data

US 2007/0176053 A1    Aug. 2, 2007

(30) Foreign Application Priority Data

Jan. 27, 2006    (FR) .................................. 06 50295

(51) Int. Cl.
*F02K 1/00*    (2006.01)
*F02K 1/78*    (2006.01)

(52) U.S. Cl. .................... 60/226.1; 60/770; 239/265.25

(58) Field of Classification Search ................ 60/226.1, 60/262, 264, 770; 239/265.19, 265.35, 265.23
See application file for complete search history.

(56) References Cited

U.S. PATENT DOCUMENTS 3,568,792 A * 3/1971 Urquhart ............... 239/265.19
3,997,132 A * 12/1976 Erwin ..................... 244/199.3
4,280,587 A    7/1981 Bhat
6,415,598 B2 * 7/2002 Pinker ....................... 60/226.1
2004/0140397 A1    7/2004 Dun
2005/0223691 A1    10/2005 Viswanathan

FOREIGN PATENT DOCUMENTS

| EP | 1 104 847 A2 | 6/2001 |
| FR | 2 294 085 | 7/1976 |
| FR | 2 740 832 | 5/1997 |

OTHER PUBLICATIONS

K. Viswanathan, "An Elegant Concept for Reduction of Jet Noise from Turbofan Engines", American Institute of Aeronautics and Astronautics Inc., XP-009073325, May 12, 2004, pp. 1970-1983.

* cited by examiner

*Primary Examiner*—Ted Kim
(74) *Attorney, Agent, or Firm*—Oblon, Spivak, McClelland, Maier & Neustadt, L.L.P.

(57) ABSTRACT

A turbofan exhaust system includes at least one exhaust nozzle with a trailing edge having an upper edge, a lower edge, an inner lateral edge-and an outer lateral edge. The upper edge is upstream with respect to the lower edge. The outer lateral edge of the exhaust nozzle is also upstream of the inner lateral edge. This arrangement makes it possible to reduce the noise perceived in the cabin of the aircraft at the same time as the noise perceived on the ground.

9 Claims, 2 Drawing Sheets

TURBOFAN EXHAUST SYSTEM

BACKGROUND OF THE INVENTION AND DESCRIPTION OF THE PRIOR ART

The present invention relates to the field of aircraft propelled by at least one turbofan fastened in the vicinity of their fuselage, particularly below a wing or to the rear, and is aimed at a means for attenuating the noise emitted by the engine.

A turbofan consists of a gas turbine engine driving a cowled fan which is generally placed upstream. The mass of air sucked in by the engine is divided into a primary stream and a secondary stream, these streams being concentric. The primary stream is guided toward the primary body where it is compressed again, heated in a combustion chamber, guided toward successive stages of turbines and then ejected in a primary gas stream. The secondary stream is compressed by a cowled fan stage and then exhausted directly without having been heated. The two streams can be exhausted separately in two concentric streams or else mixed in a common duct prior to being exhausted. One or more turbine stages of the primary body are assigned to driving the fan. The jet engine is housed in a nacelle configured in such a way as to make the aerodynamic drag as small as possible. In the case of an engine in which the primary and secondary streams are exhausted separately, the nacelle comprises a first part encasing the fan and a second part forming the cowling of the primary body. The two casings are each terminated in the downstream direction by an exhaust nozzle, one for the primary stream and one for the secondary stream. In the case where the streams are mixed, the nacelle forms a single outer casing terminated by an exhaust nozzle for the combined streams: inside the nacelle the exhaust plane of the exhaust nozzle for the primary stream is situated upstream with respect to the exhaust plane for the mixed stream.

The noise emissions from civil turbofan engines have two main sources: the jet leaving the nozzle and the noise of the fan upstream. The present invention is concerned with the noise emitted by the jet leaving the nozzle.

The noise emitted by aircraft is a nuisance which the aviation industry is constantly seeking to reduce. This noise is particularly perceptible during the approach and takeoff phases in areas, usually urban areas, situated in the vicinity of airports. Many solutions have already been proposed including, in particular, that described by K. Viswanathan in the article AIAA 2004-2975 "An elegant concept for reduction of jet noise from turbofan engines". A considerable noise reduction is observed in the rear direction of a bypass engine when the nozzle for the primary stream has an exhaust plane inclined in the upstream direction. This plane corresponds to the plane formed by the free edge of the nozzle. It is inclined with respect to the plane perpendicular to the axis of the engine by an angle which may range up to 45°. The axis of the engine and that of the gas stream correspond to one another.

SUMMARY OF THE INVENTION

The present invention is aimed at reducing the noise perceived in the passenger cabin of the aircraft at the same time as reducing the noise downstream of the exhaust nozzle beneath the aircraft.

This objective is achieved with a turbofan exhaust system comprising an exhaust nozzle having an upper part, a lower part, an inner lateral part and an outer lateral part, the upper part being upstream with respect to the lower part, wherein the outer lateral part of the exhaust nozzle is upstream of the inner lateral part.

It has in fact been found, surprisingly, that a noise reduction effect can be obtained in two directions corresponding to the planes passing through the axis of the engine.

Advantageously, the trailing edge forms a plane of angle A1 with the vertical of between 5 and 150. This arrangement corresponds to a reduction in the noise beneath the aircraft. It is aimed at protecting the regions situated on the ground during approach flight phases or else on takeoff. The trailing edge also forms a plane of angle A2 with the horizontal direction of between 5 and 15°. This arrangement thus makes it possible to attenuate the noise perceived in the cabin. Preferably, the angles A1 and A2 are equal.

The present invention applies to a jet engine having a separately exhausted primary stream and secondary stream, wherein at least one of the two nozzles is configured in this way.

The present invention also applies to a jet engine having a mixed primary stream and secondary stream, wherein the exhaust nozzle for the mixture stream is configured in this way.

BRIEF DESCRIPTION OF THE DRAWINGS

The invention will now be described in more detail with reference to the drawings, in which.

DESCRIPTION OF THE PREFERRED EMBODIMENTS

Figure 1:
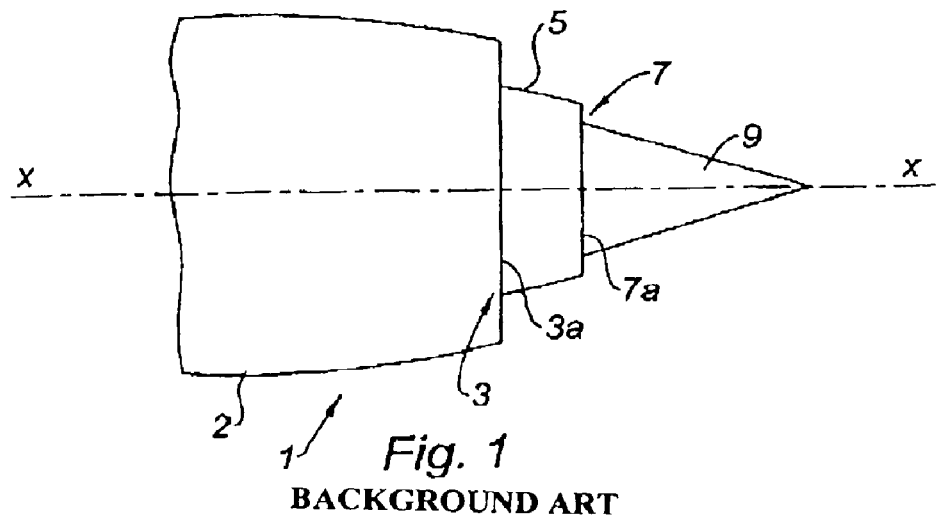
FIG. 1 is a side view showing the rear part of a jet engine nacelle according to the prior art.

The nacelle 1 according to the prior art, of which the rear part has been represented schematically, forms the casing of a turbofan (not shown) with a front fan. The upstream end is toward the left in FIG. 1. In civil aircraft, such an engine is usually attached below the wing by means of a pylon (not shown here), but there are also configurations where it is fastened to the rear of the fuselage. The nacelle is configured with an aerodynamic profile so as to produce a drag on the outer and inner surfaces that is as small as possible. According to this example, the arrangement is one in which the streams are separated. There can be seen the external cylindrical surface 2 of the nacelle encasing the fan, with a nozzle 3 for the secondary stream and its trailing edge 3a. Downstream of the secondary nozzle is the cowl 5 of the primary body, likewise cylindrical, terminated by the nozzle 7 for the primary stream and its trailing edge 7a. Here, the primary nozzle is annular about a cone 9. During operation, the primary and secondary streams are concentric and separated. They merge only downstream of the primary nozzle. The two trailing edges 3a and 7a are each situated in a plane perpendicular to the axis XX of the engine.

Figure 2:
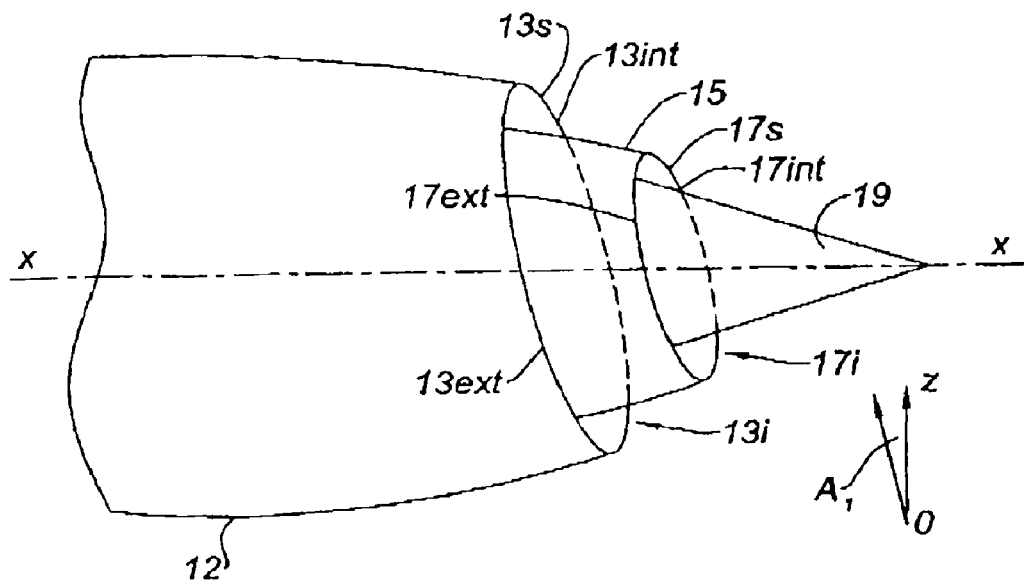
FIG. 2 is a side view, from the outer side, showing the rear part of a jet engine nacelle according to the invention.
Figure 3:
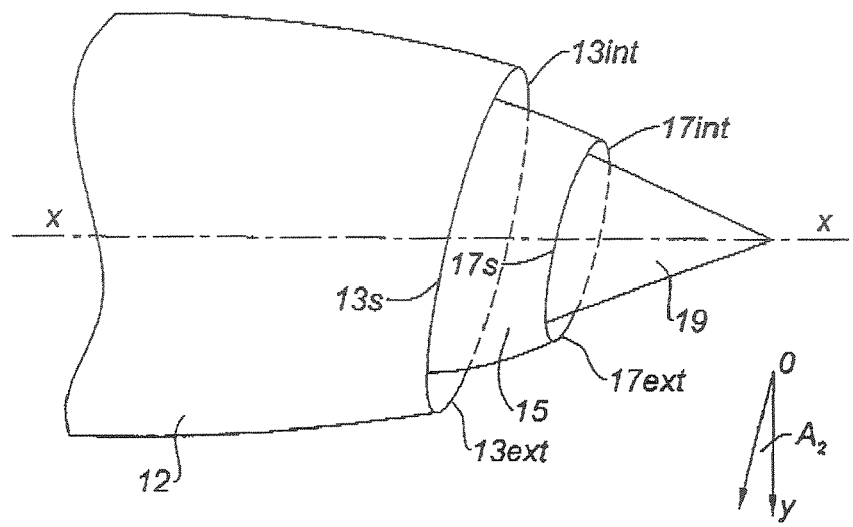
FIG. 3 is a plan view showing the nacelle of FIG. 2 mounted below an aircraft wing.

FIGS. 2 and 3 show a nozzle configuration according to the invention. FIG. 2 is a side view, from the outer side, that is to say toward the fuselage, showing the rear part of the nacelle. FIG. 3 is a plan view showing the same nacelle, below the wing for example.

As in the previous case, the rear part of the nacelle comprises the cylindrical casing 12 of the fan which is terminated by the nozzle 13 for the secondary stream delimited by its trailing edge 13a. The casing 15 of the primary body is terminated by the nozzle 17 delimited by its trailing edge 17a. The engine is extended rearwardly by a cone 19.

In the case of the nozzle 13 for the secondary stream, there can be seen the upper edge 13s and the lower edge 13i defined with respect to the horizontal plane passing through the axis XX of the engine. There can also be seen the outer lateral edge 13ext and the inner lateral edge 13int defined with respect to the vertical plane passing through the axis XX of the engine. The vertical and horizontal directions with regard to the engine are understood to relate to when the engine is mounted on the aircraft and the aircraft is on the ground. The inner and outer locations are defined with respect to the position of the engine on the aircraft. The inner side is the one which is close to the fuselage, the outer side being the one which is remote from the fuselage.

In the case of the nozzle for the primary stream, the corresponding references are again used: lower edge 17i and upper edge 17s, and also inner lateral edge 17int and outer lateral edge 17ext.

According to the invention, one of the two nozzles 13 and 17, the nozzle 13 for the secondary stream for example, is configured in the following way.

The upper edge 13s is situated upstream with respect to the lower edge 13i. When the trailing edge 13a is planar, as in FIG. 2, this plane is inclined upwardly by a defined angle A1 with respect to the vertical Oz. This angle is preferably between 5 and 15°; more particularly, it is around 10°. The lower part thus has a larger surface for reflecting the sound waves upwardly when the aircraft is in flight.

Furthermore, the outer lateral edge 13ext is situated upstream with respect to the inner lateral edge 13int. When the trailing edge 13a is planar, it forms an angle A2 with respect to the horizontal direction Oy perpendicular to the axis XX, FIG. 3. This angle is advantageously between 5 and 15°, more particularly around 10°.

The two angles A1 and A2 may be equal.

In the example shown in FIGS. 2 and 3, the two nozzles 13 and 17 are configured in such a way that the trailing edges 13a and 17a define exhaust planes 13a and 17a which are parallel to one another. Thus, in the case of the nozzle 17, the upper edge 17s is situated upstream with respect to the lower edge 17i. Moreover, the outer lateral edge 17ext is upstream with respect to the inner lateral edge 17int.

Other embodiments that shown in FIGS. 2 and 3 are possible. For example, the invention may be applied solely to the fan nozzle or else solely to the primary-stream nozzle, or else the exhaust planes of the two nozzles may be inclined by different angles.

Moreover, this embodiment relates to nozzles in which the trailing edge is in a single plane. However, the invention also covers the case where the trailing edge of one, other or both nozzles is not contained in a single plane. The nozzle, for example, may have the form of a scoop or define at least two different planes forming an angle between them.

The internal surface of the nozzle is preferably treated with a material intended to absorb sound waves, as is known practice.

Figure 4:
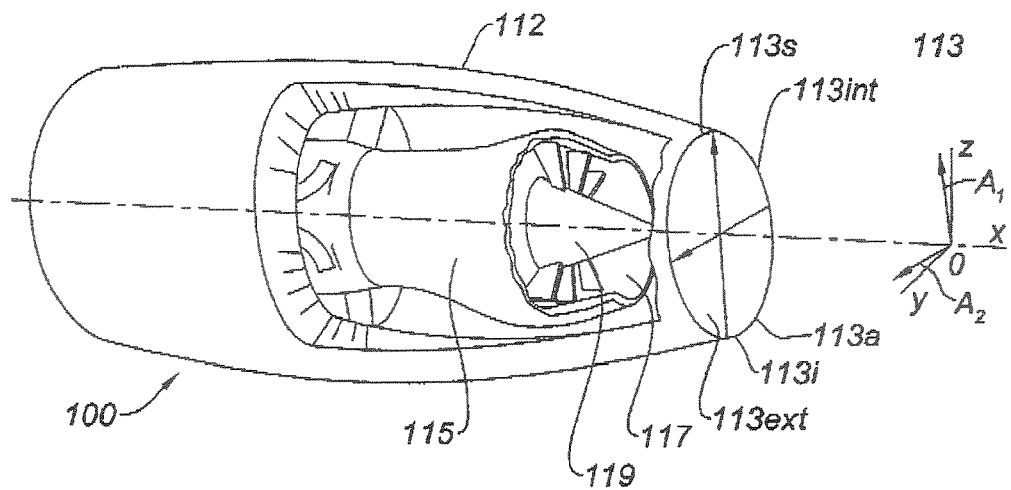
FIG. 4 shows an embodiment of the invention applied to a nozzle for mixed primary and secondary streams. The engine is shown in a rear three-quarter perspective with part of the casing cut away.

FIG. 4 shows another embodiment with the invention being applied to a nacelle in which the primary and secondary streams are mixed prior to being exhausted.

The nacelle 100 comprises a fan casing 112. Inside the case, which has been cut away, has been represented the primary body cowl 115 terminated by the nozzle 117 for the primary stream. The outlet for the primary stream inside the casing is delimited externally by the nozzle 117 and internally by a central cone 119. The cylindrical casing extends from the fan to a point downstream of the exhaust nozzle 117 for the primary stream. The shape of the nozzle 117 contributes to the at least partial mixing of the primary and secondary streams prior to exhaust in the common nozzle 113.

The invention has been applied to the exhaust nozzle 113 for the primary stream and secondary stream mixture.

In the same way as in the case of one of the nozzles 13 or 17 of the previous application, the exhaust nozzle 113 for the common stream has, with respect to the forward direction of travel of the aircraft, an upper edge 113s situated upstream with respect to the lower edge 113i. The outer lateral edge is likewise situated upstream with respect to the inner lateral edge 113int.

The exhaust plane formed by the trailing edge 113a is inclined, in the orthonormal reference frame Oxyz, firstly with respect to the vertical Oz passing through the axis XX by an angle A1, and secondly with respect to the horizontal Oy by an angle A2. These angles are preferably between 5 and 15°, more particularly around 10°.

Here, the trailing edge 113a of the nozzle 113 is in a single plane. It also comes within the scope of the invention to configure the nozzle in such a way that its trailing edge is not planar and that, for example, it forms a scoop.

The invention claimed is:

1. An exhaust nozzle for a turbofan exhaust system comprising:
   a trailing edge, the trailing edge including an upper edge and a lower edge with respect to a horizontal plane passing through a main axis of the turbofan, and an inner lateral edge and an outer lateral edge with respect to a vertical plane passing through the main axis of the turbofan,
   wherein endpoints of the upper edge and the lower edge intersect the horizontal plane,
   wherein endpoints of the inner lateral edge and the outer lateral edge intersect the vertical plane,
   wherein the upper edge is upstream with respect to the lower edge such that points on the upper edge are upstream of opposite corresponding points about the horizontal plane on the lower edge, and
   wherein the outer lateral edge of the exhaust nozzle is upstream of the inner lateral edge such that points on the outer lateral edge are upstream of opposite corresponding points about the vertical plane on the inner lateral edge.

2. The nozzle as claimed in claim 1, wherein the trailing edge forms a plane of angle A1 with a vertical direction of between 5 and 15°.

3. The nozzle as claimed in claim 2, wherein the trailing edge forms a plane of angle A2 with a horizontal direction of between 5 and 15°.

4. The nozzle as claimed in claim 3, wherein the angles A1 and A2 are equal.

5. A turbofan jet engine exhaust system having a separately exhausted primary stream and secondary stream and comprising an exhaust nozzle for the primary stream and an exhaust nozzle for the secondary stream, wherein at least one of the two exhaust nozzles is configured as claimed in claim 1.

6. The exhaust system as claimed in claim 5, wherein trailing edges of the exhaust nozzle for the primary stream and the secondary steam define exhaust planes, and the exhaust planes are parallel to each other.

7. A turbofan jet engine exhaust system having a mixed primary stream and secondary stream, wherein an exhaust nozzle for the mixed stream is configured as claimed in claim 1.

8. A turbofan comprising an exhaust nozzle as claimed in claim 1.

9. The nozzle as claimed in claim 1, wherein the nozzle is treated with a sound absorbent material.

* * * * *